(12) United States Patent
Perona et al.

(10) Patent No.: US 9,092,458 B1
(45) Date of Patent: Jul. 28, 2015

(54) SYSTEM AND METHOD FOR MANAGING SEARCH RESULTS INCLUDING GRAPHICS

(75) Inventors: Pietro Perona, Altadena, CA (US); Luis Goncalves, Pasadena, CA (US); Enrico Di Bernardo, Glendora, CA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 13/615,381

(22) Filed: Sep. 13, 2012

Related U.S. Application Data

(63) Continuation of application No. 11/370,589, filed on Mar. 8, 2006, now abandoned.

(60) Provisional application No. 60/659,501, filed on Mar. 8, 2005.

(51) Int. Cl.
G06F 17/30 (2006.01)
G06F 7/00 (2006.01)

(52) U.S. Cl.
CPC .... *G06F 17/30253* (2013.01); *G06F 17/30256* (2013.01); *G06F 17/30274* (2013.01); *G06F 17/30277* (2013.01); *G06F 17/30864* (2013.01)

(58) Field of Classification Search
CPC .............. G06F 17/30247; G06F 17/30253; G06F 17/30256; G06F 17/30259; G06F 17/30274; G06F 17/30277
USPC ......................... 707/726, 741, 748
See application file for complete search history.

(56) References Cited

U.S. PATENT DOCUMENTS

| | | | |
|---|---|---|---|
| 3,785,262 A | 1/1974 | Stroke | |
| 4,675,502 A | 6/1987 | Haefner et al. | |
| 4,954,962 A | 9/1990 | Evans et al. | |
| 4,965,442 A | 10/1990 | Girod et al. | |
| 5,016,173 A | 5/1991 | Kenet et al. | |
| 5,040,116 A | 8/1991 | Evans et al. | |
| 5,831,717 A | 11/1998 | Ikebuchi | |
| 5,911,139 A | 6/1999 | Jain et al. | |
| 6,028,671 A | 2/2000 | Svetkoff et al. | |
| 6,035,055 A | 3/2000 | Wang et al. | |
| 6,072,903 A | 6/2000 | Maki et al. | |
| 6,084,595 A | 7/2000 | Bach et al. | |
| 6,101,455 A | 8/2000 | Davis | |
| 6,389,417 B1 | 5/2002 | Shin et al. | |

(Continued)

OTHER PUBLICATIONS

Chen et al., Content-Based Image Retrieval by Clustering, MIR'03, published Nov. 2003, pg. 193-200.*

(Continued)

*Primary Examiner* — Jeffrey A Burke
(74) *Attorney, Agent, or Firm* — Knobbe, Martens, Olson & Bear LLP

(57) ABSTRACT

A system and method of sorting graphics files with a graphic server and image search engine is disclosed. The method preferably comprises the steps of: receiving a plurality of search results where each of the search results comprising one or more associated graphics; using a general purpose computer to identifying one or more groups of said graphics that depict or otherwise possess similar visual features; and returning the plurality of search results to a user in accordance with said identified groups. The preferred embodiment effectively clusters graphics files, particularly image files, based on upon shared scale-invariant features in order to enable the user to readily identify collections of images relevant to the user while skip past collections of less relevant images.

19 Claims, 5 Drawing Sheets

(56) References Cited

U.S. PATENT DOCUMENTS

| | | | |
|---|---|---|---|
| 6,415,282 B1* | 7/2002 | Mukherjea et al. | 707/737 |
| 6,512,850 B2* | 1/2003 | Yaung | 382/225 |
| 6,941,321 B2* | 9/2005 | Schuetze et al. | 1/1 |
| 7,099,860 B1* | 8/2006 | Liu et al. | 1/1 |
| 7,165,080 B2* | 1/2007 | Kotcheff et al. | 707/706 |
| 7,283,983 B2 | 10/2007 | Dooley et al. | |
| 7,333,963 B2 | 2/2008 | Widrow et al. | |
| 7,457,825 B2* | 11/2008 | Li et al. | 1/1 |
| 7,565,139 B2 | 7/2009 | Neven, Sr. et al. | |
| 7,627,556 B2* | 12/2009 | Liu et al. | 1/1 |
| 7,725,451 B2 | 5/2010 | Jing et al. | |
| 7,765,231 B2 | 7/2010 | Rathus et al. | |
| 7,860,854 B2 | 12/2010 | Lipson et al. | |
| 7,903,838 B2 | 3/2011 | Hudnut et al. | |
| 8,229,161 B2 | 7/2012 | Hudnut et al. | |
| 2001/0048763 A1 | 12/2001 | Takatsuka et al. | |
| 2002/0168117 A1* | 11/2002 | Lee et al. | 382/305 |
| 2003/0229441 A1 | 12/2003 | Pechatnikov et al. | |
| 2004/0193322 A1 | 9/2004 | Pirjanian et al. | |
| 2004/0205629 A1* | 10/2004 | Rosenholtz et al. | 715/526 |
| 2005/0150697 A1 | 7/2005 | Altman et al. | |
| 2005/0185060 A1 | 8/2005 | Neven, Sr. | |
| 2006/0018516 A1 | 1/2006 | Masoud et al. | |
| 2006/0018539 A1 | 1/2006 | Sato et al. | |
| 2007/0133947 A1* | 6/2007 | Armitage et al. | 386/95 |
| 2007/0258706 A1 | 11/2007 | Raskar et al. | |
| 2008/0297360 A1 | 12/2008 | Knox et al. | |

OTHER PUBLICATIONS

Smith et al., Visually Searching the Web for Content, IEEE Multimedia, published 1997, p. 12-20.*

John Smith and Shih-Fu Chen, An Image and Video Search Engine for the World-wide Web, published 1997.*

* cited by examiner

SYSTEM AND METHOD FOR MANAGING SEARCH RESULTS INCLUDING GRAPHICS

CROSS-REFERENCE TO RELATED APPLICATION

This application is a continuation of U.S. patent application Ser. No. 11/370,589 filed Mar. 8, 2006, now abandoned which claims the benefit of U.S. Provisional Patent Application Ser. No. 60/659,501 filed Mar. 8, 2005, titled "METHODS FOR FINDING SIMILARITIES IN IMAGES," both of which are hereby incorporated by reference herein for all purposes.

TECHNICAL FIELD

The invention generally relates to an organizational tool for managing the display of images and other graphics. In particular, the invention in the preferred embodiment relates to a system and method for sorting graphics identified by a search engine, preferably as an Internet search engine, into a groups of similar images based on common visual features.

BACKGROUND

Images and movies are becoming increasingly prevalent on the Internet with the adoption of inexpensive memory stores and broadband connectivity. While various forms of traditional text-based content have been indexed by and searchable with sophisticated Internet search engines for many years, the identification of relevant image and movie data has presented a greater challenge. The primary way to search the Internet for an image or a movie is to query an Internet search engine with a set of text keywords. The search engine then returns a list of images whose filename or caption contain the keywords, or images that are located in the vicinity of the keywords in a web page. Unfortunately, this technique returns a number of false positives, i.e., images that have little or nothing to do with the desired search. Moreover, the search results are typically presented in the form of a linear list whose ordering is unrelated to the images' content, which forces users to scroll through hundreds of images until they find the image of interest assuming that such image is present. This can be frustrating and very time consuming.

There is therefore a need for a system that allows images to be graphically organized based on their content. This organization may then be used in conjunction with a search engine, for example, to enable a user to determine the subjective relevancy of the images based on their content instead of the images' filename or caption text alone.

SUMMARY

The invention in some embodiments features a system and method for sorting graphics identified by a search engine, for example, into groups of similar images based on visual features common to the members of the group. In one exemplary embodiment, the method of sorting graphics files with a graphic server operably coupled to a search engine, for example, comprises the steps of: receiving a plurality of search results where each of the search result includes one or more graphics; extracting visual features from said graphics; identifying visual features common to multiple graphics; generating a similarity metric between combinations of the plurality of graphics based on the common visual features; classifying the search results into a plurality of groups based on the similarity metric of combinations of the graphics of the associated search results; and providing the search results in said groups to a user. The user may then display the graphics and/or associated search results in the groups within a browser window in order to readily distinguish between results of highest interest to the user from results of lowest interest to the user. The groups of similar results may be presented together in one or more search result pages, or organized into separate folders reachable by clicking on the group of interest to the user. The user in some embodiments may subsequently refine an initial keyword search using information about a group of images of interest to the user.

In the preferred embodiment, the sorting engine is an Internet search engine and the search results include images and video from webpages. The visual features are preferably scale-invariant feature transform (SIFT) features to provide robust object recognition in the presence of color changes, lighting changes, changes in image resolution, and changes in object position and orientation, for example. In the preferred embodiment, the graphics server and user are connected via the Internet, although one skilled in the art will appreciate that the present invention can be employed as a graphic sorting tool to sort and group images on the user's personal computing device.

In another exemplary embodiment, the method of sorting graphics files includes: receiving a plurality of search results where each of the search results comprises one or more associated graphics; identifying one or more groups of said graphics sharing one or more similar visual features; and providing the plurality of search results to a user with the results organized for display in accordance with the identified groups. In the preferred embodiment, the similar visual features include SIFT features extracted from images, videos, and other graphics files for purposes of identifying related visual patterns which are generally associated with objects and product logos. The visual features may be characterized by a descriptor in the form of a multi-dimensional array including image gradient data, an image scale, a feature orientation, and a geometric feature location.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
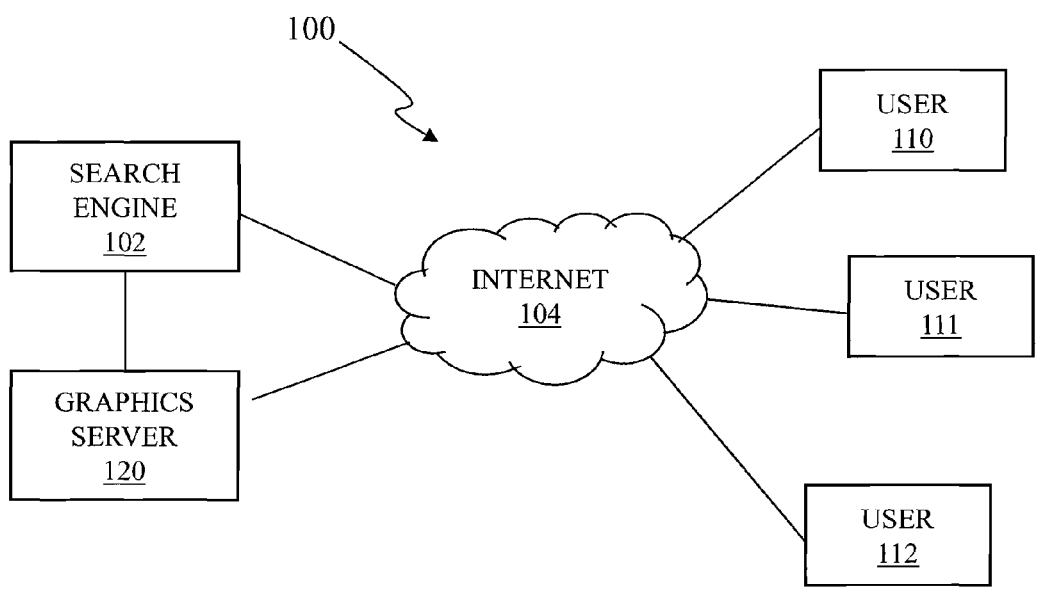
FIG. 1 is a functional block diagram of a distributed network with a graphics server for ranking the graphics search results of an image search engine, in accordance with the preferred embodiment of the present invention.

Illustrated in FIG. 1 is a network for implementing the method of sorting graphics generated with a search engine, although the present invention may also be used to refine a previous search in order to find more relevant search results. The network 100 preferably includes a search engine 102 coupled to a graphics server 120. In accordance with an exemplary embodiment, a plurality of users 110-112 access the search engine 102 for purposes of initiating queries whose results may be sorted or organized by the graphics server 120 based on similarities in the graphics contained therein. In the preferred embodiment, the users 110-112 diagrammatically represent computing devices including personal computers, personal digital assistants, mobile phone, and the like. The search engine 102 is an Internet search engine enabling users to locate resources accessed via a network such as the World Wide Web 104 in accordance with the Hypertext Transfer Protocol (HTTP) and Transmission Control Protocol/Internet Protocol (TCP/IP). Those skilled in the art will, however, recognize that the invention may also be employed in any of a number of system architectures including local area networks, metropolitan networks, personal computers, cell phones, and the like.

Additionally, unless otherwise indicated, the functions described herein are performed by programs including executable code or instructions running on one or more general-purpose computers. The computers can include one or more central processing units for executing program code, volatile memory, such as random access memory (RAM) for temporarily storing data and data structures during program execution, non-volatile memory, such as a hard disc drive or optical drive, for storing programs and data, including databases, and a network interface for accessing an intranet and/or the Internet. However, the functions described herein can also be implemented using special purpose computers, state machines, and/or hardwired electronic circuits. The example processes described herein do not necessarily have to be performed in the described sequence, and not all states have to be reached or performed.

Further, while the following description may refer to "clicking on" a link or button, or pressing a key to provide a command or make a selection, the commands or selections can also be made using other input techniques, such as using voice input, pen input, mousing or hovering over an input area, and/or the like. As used herein, the term "click-through" is defined broadly, and refers, in addition to its ordinary meaning, to clicking on a hyperlink included within search result listings to view an underlying website.

As used herein, the term "document" is defined broadly, and includes, in addition to its ordinary meaning, and type of content, data or information, including without limitation, the content, data and information contained in computer files and websites. Content stored by servers and/or transmitted via the communications networks and systems described herein may be stored as a single document, a collection of documents, or even a portion of a document. Moreover, the term "document" is not limited to computer files containing text, but also includes computer files containing graphics, audio, video, and other multimedia data. Documents and/or portions of documents may be stored on one ore more servers.

As used herein, the term "listing" is defined broadly, and includes, in addition to its ordinary meaning, an individual record displayed on a search results page in response to a query of the search engine.

Figure 2:
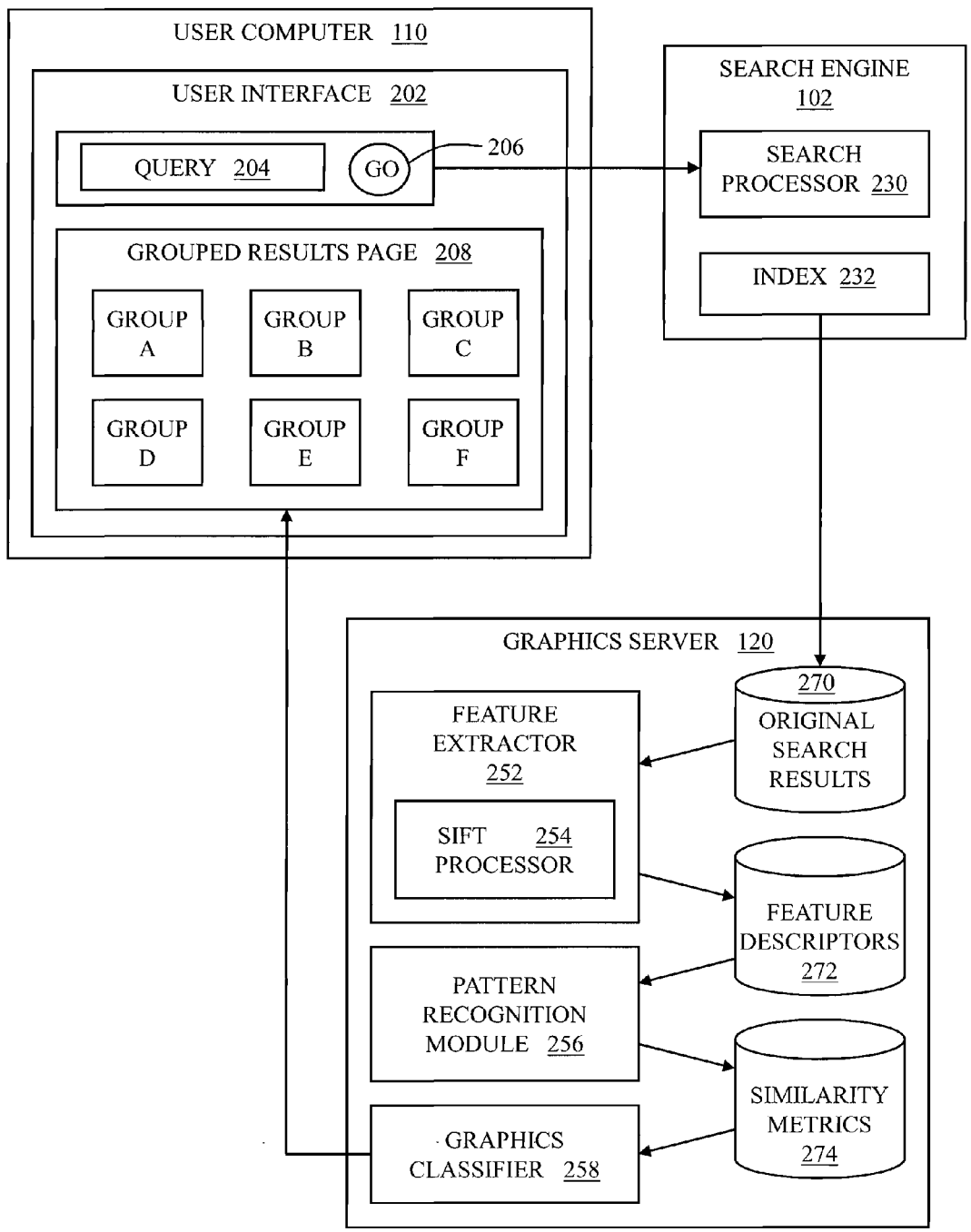
FIG. 2 is a functional block diagram of a graphics server for ranking the graphics search results of an image search engine, in accordance with the preferred embodiment of the present invention.

Illustrated in FIG. 2 is a functional block diagram of the user computer 110, search engine 102, and graphics server 120. The user computer 110 include a user interface 202, preferably a graphical user interface (GUI), for displaying a webpage through which the user may enter one or more keywords to be searched into a dialogue box 204. When the search is invoked by clicking on the go button 206, the query is transmitted to the search engine's 102 search processor 230 which retrieves relevant search results or other identified resources from one or more sources diagrammatically represented by the search index 232. The "index" 232 is a form of database that associates a plurality of search terms with one or more resources relevant to the search term. The categories of search results or resources typically include webpages, documents, music, and graphics which may be retrieved from local memory or from remote systems via their respective uniform resource locators (URLS). The search index 232 may be compiled and maintained by the search engine 102, by a third-party web crawler, or a combination thereof. The search results returned from the index 232 are listed in accordance with an initial relevancy ranking referred to herein as the "original rank" or "default rank."

The search results with the original rank are transmitted to the graphics server 120 where they are made available for graphics processing via a search results database 270. The graphics server 120 in the preferred embodiment includes a feature extractor 252 for identifying and describing visual features from the graphics data of the search results 270, a pattern recognition module 256 for determining the relatedness of the identified graphics based on the descriptors 272 of the visual features shared by the graphics, and a graphics classifier 258 for re-ordering and formatting the search results based on the relatedness of the graphics as represented by similarity metrics 274.

The feature extractor 252 preferably identifies scale-invariant features with a scale invariant transform (SIFT) processor 254 discuss in more detail below. The pattern recognition module 256 preferably detects combinations or "patterns" of extracted SIFT features that are shared by two or more graphics, the combinations of features generally corresponding to objects or graphical indicia depicted in multiple images, for example. The graphics classifier 258 then sorts the search results into groups, for example, based on the similarities in the images of the original search results 270. The grouped search results 208 are returned to the user 110 who may then efficiently preview and select from the newly ordered listings. The grouped search results 208 may comprise thumbnails of similar images displayed in proximity to one another or located into folders—folder group A through group F for example—to enable the user to quickly locate a plurality of similar but non-identical images that are subjectively relevant to the query while suppressing other search results that were relevant to the original query but not the user's subjective intent.

Figure 3:
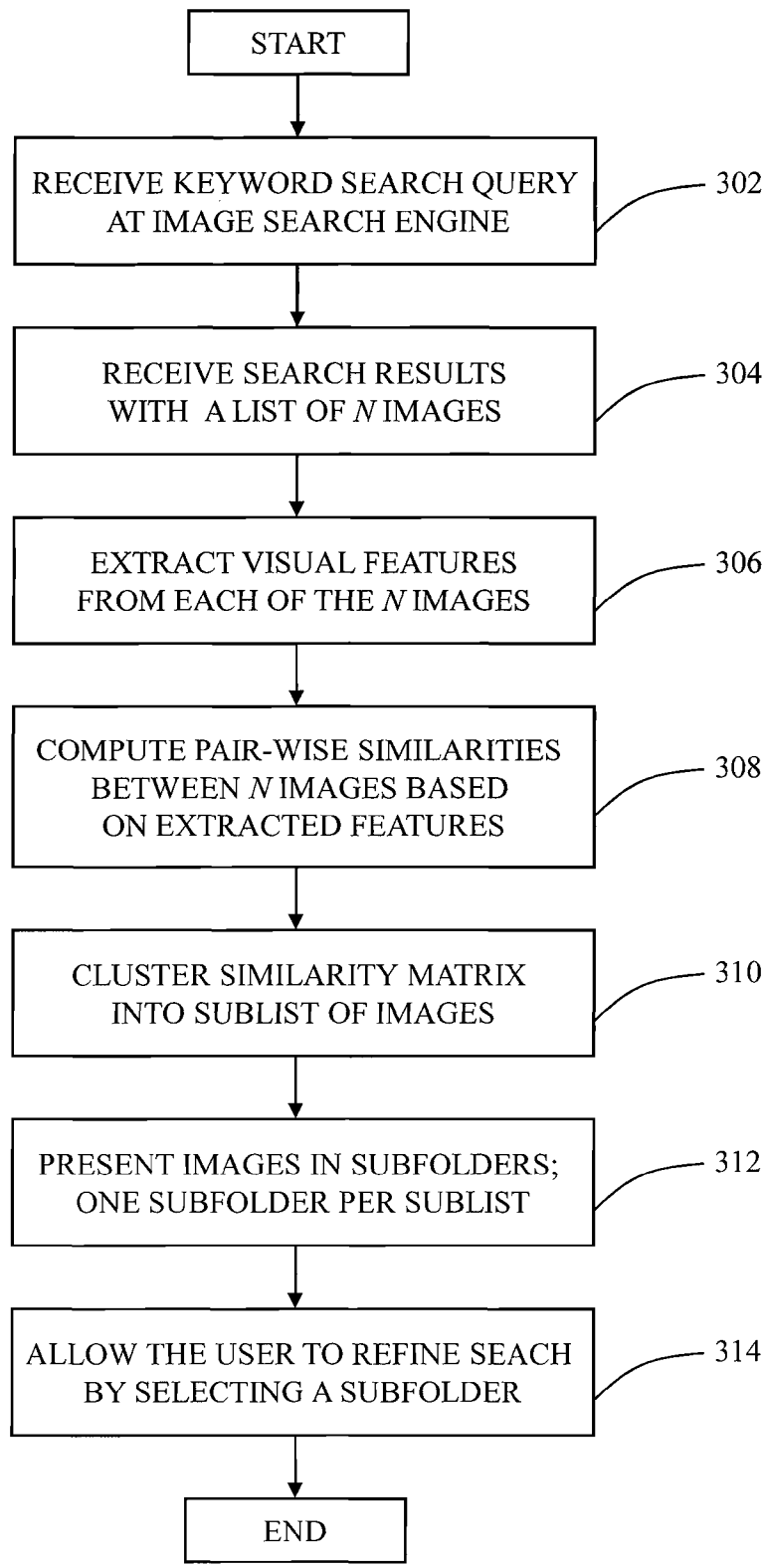
FIG. 3 is a flowchart of a process of ranking the graphics search results of an image search engine, in accordance with the preferred embodiment of the present invention.

Illustrated in FIG. 3 is a flowchart of a process of ranking the graphics search results of an image search engine. An image search engine as used herein refers to a system for identifying and retrieving graphics—including images, video, webpages including one or more images and video, or a combination thereof—based on a user query including text, graphics, or audio data. The images may be recorded in any of a number of formats including but not limited to JPEG, GIF, TIFF, BMP, and raw data, for example. The video may possess any of a number of formats including but not limited to AVI (Audio Video Interleave), Windows Media Format, MPEG (Moving Pictures Expert Group), QuickTime, RealVideo, and Shockwave, for example.

In the first step 302, the image search engine 102 receives a search query from the user 110. The query is generally a text string including one or more keywords, although the query in some embodiments may also include graphics data from an image to be searched, audio data from a voice recognition system, or a combination thereof. The query may be received from a remote computing device via a network connection, or locally should the image search engine be a software program installed on the user's personal computer, for example.

The image search engine 102 then generates 304 a list of search results that are determined to be relevant to the user's input query. The search results preferably includes a listing of N images determined to be relevant based, for example, on the presence or proximity of the query terms in the webpages from which the images were retrieved. Such results may be retrieved from an algorithmic search engine such as GOOGLE™, for example. The individual search result listings preferably include a thumbnail version of the original image, the image's file name; a summary description of the image including the size, dimensions, and format of the image; and the website from which the image data was retrieved.

The search results, including at least the N images or thumbnails, are transmitted to and received 304 by the graphics processor 120 which then extracts 306 a plurality of visual features from the N images. The plurality of visual features are preferably identified using SIFT which is able to consistently identify features with which objects can be identified independent of differences in images size, image lighting conditions, position and orientation of the features in the images and camera viewpoint. The number and quality of extracted visual features will vary depending on the image, but frequently varies between 50 and 2000 features per VGA resolution (640×480) image. The process of extracting visual features is discussed in more detail below in context of FIG. 4.

The graphics server 120 then generates 308 a measure of the relatedness or similarity between images for each unique pair of images among the N received images. The measure of similarity, referred to herein as a similarity metric, provides a quantitative expression of the similarity between two images in terms of objective criteria including the actual objects depicted in the images. In the preferred embodiment, the similarity metric associated with a pair of images is a function of the number of visual features that are common to the two images as well as the quality with which the features give rise to patterns that can be matched or aligned using an affine transformation, for example. The process of generating pairwise similarities is discussed in more detail below in context of FIG. 5.

The graphics server 120 in the preferred embodiment then organizes the individual similarity metrics 274 into an N×N similarity matrix which may be manipulated to readily identified groupings of related images. Based on the identified groupings, the graphic classifier 258 generates 310 an order or rank with which to list or otherwise display images to emphasize their similarity. In the preferred embodiment, images determined to be similar because of the presence of one or more objects depicted therein are grouped together in clusters. The subset of thumbnail images of the different clusters may be presented side-by-side on a search results page or be presented in a separate webpage accessible from the search results page via a hyperlink depicting a representative image or a portion of an image containing the one or more objects common to the subset. The graphics classifier 258 in the preferred embodiment generates the HTML code used to organize and report 312 the search result listings into (1) a plurality of thumbnail image clusters or (2) a plurality of folders including thumbnails images based on a graphic processor configuration setting or an individual user interface setting.

The preferred embodiment of the present invention is particularly advantageous when used with image search engines that return a large number of images as search results. In the prior art, an image search engine may return on the order of 1,000 images. Even when displayed with 20 thumbnail images per page, a user would need to advance through 50 pages in order to preview all the images. If the image or set of images of interest to the user appeared low in the original ranking, the user would be burdened to cycle through dozens of pages before detecting the image of interest. Depending on the time and patience of the user, the user may discontinue the search before detecting the images of interest.

The preferred embodiment of the present invention addresses the problems encountered in the prior art by effectively concentrating or collapsing similar images together, thereby enabling lower-ranked images or groups of images to appear relative high in the search result listing. If a user searches the term "soda," for example, the search results will generally include images associated with various brands of soda drinks, soda comic book issues, and baking soda, etc. Within the set of soda drink images, the results may include dozens of brands and flavors of drinks including COCA-COLA™ brand drinks and numerous forms of articles and collectibles having the COCA-COLA logo. Using the preferred embodiment, the results may be clustered into a first group associated with drinks, a second group associated with comics, and a third group associated with baking soda. The group associated with soda may be further subdivided into additional subfolders by brand and flavor in some embodiments. Using the preferred embodiment, a user interest in COCA-COLA images is conveniently presented with a group of COCA-COLA-related images from which to select, without the need to review the entire 1,000 search results. Similarly, a user interest in comics may readily filter or otherwise skip the vast number of images associated with drinks by jumping past the drink images to the images associated with comics. The convenience and time savings afforded to the user may be enormous.

In the preferred embodiment, the user 110 may select an image of interest from one of the plurality of groups (group A-group F) in order to view the corresponding subset of similar thumbnail images. The hyperlink to the associated group of similar images may include an image of the common pattern, e.g., a picture of the COCA-COLA logo used to signify a group of images including COCA-COLA related images. Clicking on a thumbnail image from a group, in turn, causes the user's browser to retrieve and display the full-size image or the webpage from which the image originated. In some embodiments, the image search is also re-executed and refined 314 by selecting a folder or an image of a folder. The refined search may use the same or different text string as the previous search, image data such as visual features common to the subset of images, or a combination thereof. Where the refined search uses additional text or keywords to locate additional images of interest to the user, the graphics server 120 may automatically identify the additional keywords by automatically identifying words used in the associated webpages with a greater frequency than the unselected images. That is, the words "COCA-COLA," which are highly correlated with images of COCA-COLA, may be automatically retrieved from the webpages for purposes of refining the search results in response to the user selecting an image from the group of images possessing the COCA-COLA brand name.

Figure 4:
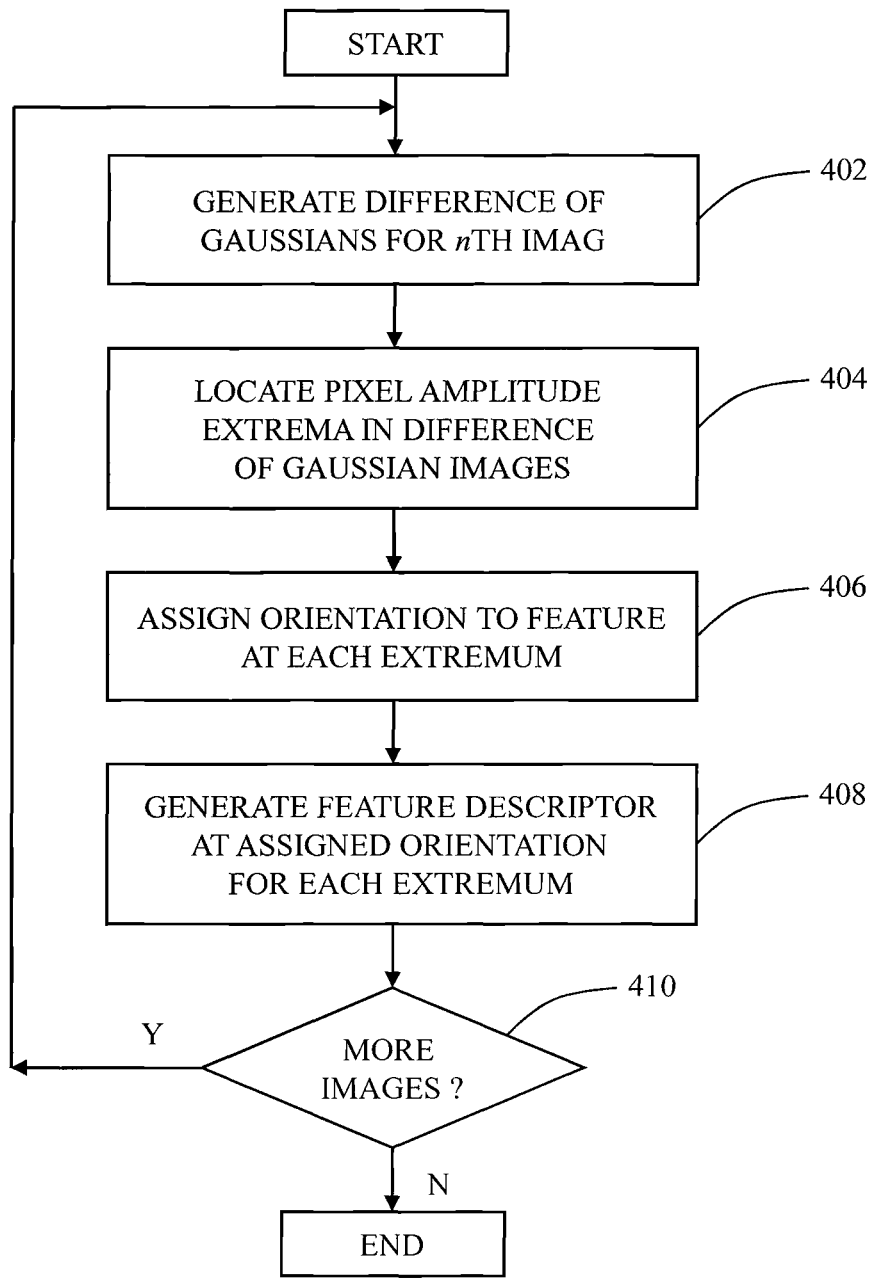
FIG. 4 is a flowchart of the method of extracting scale-invariant visual features, in accordance with the preferred embodiment of the present invention.

Illustrated in FIG. 4 is a flowchart of the method of extracting scale-invariant visual features in the preferred embodiment. As stated above, the scale-invariant features—preferably SIFT features—are extracted from each of the N images returned with the search results for purposes of determining the similarity of these images. Visual features are extracted 402 from any given image by generating a plurality of Difference-of-Gaussian (DoG) images from the input image. A Difference-of-Gaussian image represents a band-pass filtered image produced by subtracting a first copy of the image blurred with a first Gaussian kernel from a second copy of the image blurred with a second Gaussian kernel. This process is repeated for multiple frequency bands—that is, at different scales—in order to accentuate objects and object features independent of their size and resolution. While image blurring is achieved using a Gaussian convolution kernel of variable width, one skilled in the art will appreciate that the same results may be achieved by using a fixed-width Gaussian of appropriate variance and variable-resolution images produced by down-sampling the original input image.

Each of the DoG images is inspected to identify the pixel extrema including minima and maxima. To be selected, an extremum must possess the highest or lowest pixel intensity among the eight adjacent pixels in the same DoG image as well as the nine adjacent pixels in the two adjacent DoG images having the closest related band-pass filtering, i.e., the adjacent DoG images having the next highest scale and the next lowest scale if present. The identified extrema, which may be referred to herein as image "keypoints," are associated with the center point of visual features. In some embodiments, an improved estimate of the location of each extremum within a DoG image may be determined through interpolation using a 3-dimensional quadratic function, for example, to improve feature matching and stability.

With each of the visual features localized, the local image properties are used to assign an orientation to each of the keypoints. By consistently assigning each of the features an orientation, different keypoints may be readily identified within different images even where the object with which the features are associated is displaced or rotated within the image. In the preferred embodiment, the orientation is derived from an orientation histogram formed from gradient orientations at all points within a circular window around the keypoint. As one skilled in the art will appreciate, it may be beneficial to weight the gradient magnitudes with a circularly-symmetric Gaussian weighting function where the gradients are based on non-adjacent pixels in the vicinity of a keypoint. The peak in the orientation histogram, which corresponds to a dominant direction of the gradients local to a keypoint, is assigned to be the feature's orientation.

With the orientation of each keypoint assigned, the SIFT processor 254 of the feature extractor 252 generates 408 a feature descriptor to characterize the image data in a region surrounding each identified keypoint at its respective orientation. In the preferred embodiment, the surrounding region within the associated DoG image is subdivided into an M×M array of subfields aligned with the keypoint's assigned orientation. Each subfield in turn is characterized by an orientation histogram having a plurality of bins, each bin representing the sum of the image's gradient magnitudes possessing a direction within a particular angular range and present within the associated subfield. As one skilled in the art will appreciate, generating the feature descriptor from the one DoG image in which the inter-scale extrema is located ensures that the feature descriptor is largely independent of the scale at which the associated object is depicted in the images being compared. In the preferred embodiment, the feature descriptor includes a 128 byte array corresponding to a 4×4 array of subfields with each subfield including eight bins corresponding to an angular width of 45 degrees. The feature descriptor in the preferred embodiment further includes an identifier of the associated image, the scale of the DoG image in which the associated keypoint was identified, the orientation of the feature, and the geometric location of the keypoint in the associated DoG image.

The process of generating 402 DoG images, localizing 404 pixel extrema across the DoG images, assigning 406 an orientation to each of the localized extrema, and generating 408 a feature descriptor for each of the localized extrema is then repeated 410 for each of the N images returned by the search engine 102 in response to the user query.

Figure 5:
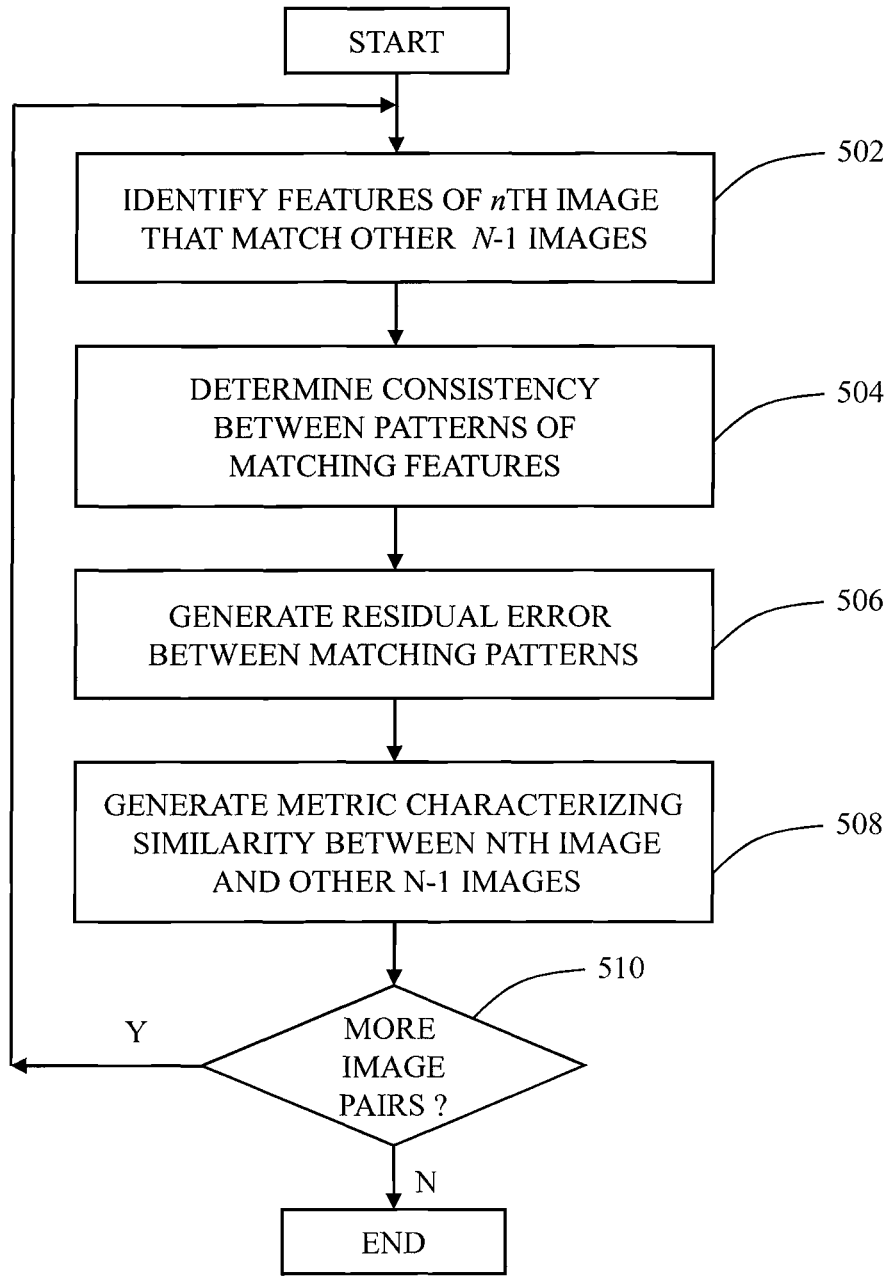
FIG. 5 is a flowchart of the method of generating pair-wise similarities between the N images, in accordance with the preferred embodiment of the present invention.

Illustrated in FIG. 5 is a flowchart of the method of generating pair-wise similarities between the N images in accordance with the preferred embodiment. As a first step, each of the extracted feature descriptors of each image is compared to the feature descriptors extracted from each of the remaining N−1 images to identify 502 matching features common to multiple images. Two features match when the Euclidian distance between their respective SIFT feature descriptors is below some threshold. These matching features, referred to here as nearest neighbors, may be identified in any number of ways including a linear search ("brute force search"). In the preferred embodiment, however, the pattern recognition module 256 identifies a nearest-neighbor using a Best-Bin-First search in which the vector components of a feature descriptor are used to search a binary tree composed from each of the feature descriptors of the other images to be searched. Although the Best-Bin-First search is generally less accurate than the linear search, the Best-Bin-First search provides substantially the same results with significant computational savings. After the nearest-neighbor is identified, a counter associated with the image containing the nearest neighbor is incremented to effectively enter a "vote" to ascribe similarity between the two images with respect to the particular feature. In some embodiments, the voting is performed in a 5 dimensional space where the dimensions are image id or number, and the relative scale, rotation, and translation of the two matching features. Those image pairs that accumulate a number of "votes" in excess of a predetermined threshold are selected for subsequent processing as described below while the image pairs with an insufficient number of votes are assigned a similarity metric of zero.

With the features common to pairs of images identified, the pattern recognition module 256 determines 504 the geometric consistency between the combinations of matching features in pairs of images. In the preferred embodiment, a combination of features (referred to as "feature patterns") that are common to the DoG images associated with two images are aligned using an affine transformation, which maps the coordinates of features of one image to the coordinates of the corresponding features in the other image. If the feature patterns are associated with the same underlying object, the feature descriptors characterizing the object will geometrically align with small difference in the respective feature coordinates.

The degree to which any two of the N images match (or fail to match) can be quantified in terms of a "residual error" computed 506 for each affine transform comparison. A small error signifies a close alignment between the feature patterns which may be due to the fact that the same underlying object is being depicted in the two images. In contrast, a large error generally indicates that the feature patterns do not align, although common feature descriptors match individually by coincidence.

In the next step, a similarity metric is generated 508 to qualify the similarity of each unique pair of the N images. Although one skilled in the art will recognize that the similarity metric may be defined in a number of different ways depending on the application, the similarity metric associated with two images is defined in the preferred embodiment to be (1) the ratio of the number of features of a matching feature pattern to (2) the residual error associated with the feature pattern, as computed above.

As illustrated by decision block 510, the process described above is repeated for each unique pair of images within the set of N images. Assuming that the similarity metric is substantially equal for each pair of images independent of the order in which their similarity is assessed, the set of similarity metrics include N (N−1) metrics which may be organized into a square matrix populated by zero's along the diagonal and the upper triangle (or lower triangle, alternatively, depending on convention). The similarity metrics that populate the matrix may be processed by the graphics classifier 258 using graph theory or a resorting algorithm (known to those skilled in the art) to distinguish groups or subsets of strongly-related images in which each of the images possesses a high degree of similarity to every other image of the subset. One example of a suitable sorting algorithm(s) is referred to as "Spectral Clustering" which refers to a class of techniques that rely on the eigenstructure of a similarity matrix to partition points into disjoint clusters with points in the same cluster having high similarity and points in different clusters having low similarity. Other graph clustering techniques known to those skilled in the art include the Minimum Cut algorithm which is based on a maximum flow technique, and the Normalized Cut algorithm.

If the degree of similarity between a particular image and every other image of a group exceeds a predetermined threshold, for example, the particular image or its associated thumbnail is added to the group before the group is returned to the user in the grouped results page 208. Although each of the N images generally appears in a single cluster (one group of group A-group F), images that have high similarity to two or more images in different groups may be duplicated and clustered together with multiple groups in the results page 208.

The process of implementing SIFT and pattern recognition described above has been extensively described in U.S. Pat. No. 6,711,293 issued Mar. 23, 2004, which is hereby incorporated by reference herein, and described by David G. Lowe, "Object Recognition from Local Scale-Invariant Features," Proceedings of the International Conference on Computer Vision, Corfu, Greece, September, 1999 and by David G. Lowe, "Local Feature View Clustering for 3D Object Recognition," Proceedings of the IEEE Conference on Computer Vision and Pattern Recognition, Kauai, Hi., December, 2001; both of which are incorporated herein by reference.

While the preferred embodiment described above is intended for use with an Internet search engine or personal computer (PC)-based search engine, the graphics server 120 may also be employed to identify and locate copyrighted images (with or without the copyright notice) on the Internet or in a database, for example. In an attempt to locate copyright infringers, the graphics process 120 can extract the visual features of the copyright image to be policed; retrieve suspect images from the Internet using keywords, URLs of suspected infringers, or a combination thereof; compare visual features extracted from the suspect images to the known features of the copyright image; determine the similarity between the copyright image and suspect images; identify the infringing images from the set of suspect images; and verify infringement with a human editor, for example.

In still other embodiments, the graphics server 120 may be employed to: (1) identify and locate images including a known brand, design, or logo; (2) identify and locate several instances of the same image or substantially similar versions of an image that may include minor editing, the forms of editing including, for instance, cropping, re-sampling, and modification or removal of copyright information; and (3) identify and locate all images in a database of images or video sequences, for example, that contain a user specified visual pattern, even if the original graphic has been distorted by: changes in scale, rotations (in-plane and out-of-plane), translations, affine geometric transformation, changes in brightness, changes in color, changes in gamma, compression artifacts, noise from various sources, lens distortion from an imaging process, cropping, changes in lighting, and occlusions that may obstruct portions of an object to be recognized.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A computer implemented method comprising:

receiving, at a computer system comprising hardware, a user search query consisting only of text;

receiving, at the computer system, ranked image search results from a first image search corresponding to the user search query, the user search query consisting only of text, the ranked search results comprising a first plurality of images;

classifying, by the computer system, a first subset of the first plurality of images as a first group based at least in part on a first subject matter;

classifying, by the computer system, a second subset of the first plurality of images as a second group based at least in part on a second subject matter;

providing, by the computer system, for display on a user computing device a first visual representation corresponding to the first subset of images, the first visual representation comprising a first thumbnail image representative of the first subject matter, and a second visual representation corresponding to the second subset of images, the second visual representation comprising a second thumbnail image representative of the second subject matter;

receiving, by the computer system, a selection of the first thumbnail image, the second thumbnail image being unselected;

automatically identifying, by the computer system, a first keyword based at least in part on the user selection of the first thumbnail image, the first keyword not included in the user search query, wherein the identification of the first keyword is based at least in part on identifying words used in webpages associated with the first subset of images represented by the selected first thumbnail image, wherein the identified words appear in greater frequency in webpages associated with the first subset of images represented by the selected first thumbnail image than a frequency of appearance of the identified words in webpages associated with the second subset of images represented by the unselected second thumbnail image;

executing, by the computer system, a first refined image search using a first search query comprising the automatically identified first keyword, wherein the first search query comprising the automatically identified first keyword is different than the user search query, wherein the first refined image search is performed using a first textual search query comprising the automatically identified first keyword;

receiving, by the computer system, second ranked image search results from the first refined image search, the second ranked search results comprising a second plurality of images;

generating, by the computer system, a similarity metric for images included in the second ranked image search results based at least in part on how many visual features are common to two or more images in the second ranked image search results and a quality with which the visual features give rise to patterns that can be matched or aligned;

classifying, by the computer system, a subset of the second plurality of images as a third group using the similarity metric for images included in the second plurality of images;

providing for display, by the computer system, on the user computing device:
  a visual representation corresponding to the third group of images, the visual representation corresponding to the third group of images comprising a third thumbnail image, and
  a visual representation corresponding to a fourth group of images, the visual representation corresponding to the fourth group of images comprising a fourth thumbnail image;

receiving, by the computer system, a selection of the third thumbnail image, the fourth thumbnail image being unselected;

automatically identifying, by the computer system, a second keyword based at least in part on the user selection of the third thumbnail image, the second keyword not included in the user search query, wherein the identification of the second keyword is based at least in part on identifying words used in webpages associated with the third group of images represented by the selected third representative thumbnail image, wherein the identified words appear in webpages associated with the third group of images, represented by the selected third thumbnail image, in greater frequency than a frequency of appearance of the identified words in webpages associated with the fourth group of images represented by the unselected fourth thumbnail image;

executing, by the computer system, a second refined image search using a second search query comprising the automatically identified second keyword, wherein the second search query comprising the automatically identified second keyword is different than the user search query, wherein the second refined image search is performed using a second textual search query comprising the automatically identified second keyword; and providing, by the computer system, for display on the user computing device search results, comprising a fifth group of images, from the second refined image search.

2. The method of claim 1,
wherein generating the similarity metric for images included in the second ranked image search results further comprises generating the similarity metric between combinations of images in the second plurality of images based at least in part on the identified common visual features.

3. The method of claim 2, wherein the visual features comprise scale-invariant features.

4. The method of claim 1, wherein the first ranked image search results comprise hyperlinks to resources.

5. The method of claim 1, wherein the method is performed using a graphic server operably coupled to a search engine, and the graphics server is coupled to the user computing device over a network.

6. The method of claim 1, the method further comprising providing for display on the user computing device, in association with the third thumbnail image, corresponding website source information and dimension information.

7. The method of claim 1, wherein a first image in the second plurality of images is included in both the third group and the fourth group at least partly in response to determining that the first image exceeds a similarity threshold with respect to other images in the third group and other images in the fourth group.

8. The method of claim 1, the method further comprising:
  wherein the third thumbnail image corresponding to the third group of images and the fourth thumbnail image corresponding to the fourth group of images are displayed at the same time as separate groupings.

9. A system comprising:
one or more computing devices;
a non-transitory computer storage medium storing instructions that when executed by the one or more computing devices are configured to cause the system to perform operations comprising:
receiving a user search query consisting only of text;
receiving ranked image search results from a first image search corresponding to the user search query, the ranked search results comprising a first plurality of images;
classifying a first subset of the first plurality of images as a first group based at least in part on a first subject matter;
classifying a second subset of the first plurality of images as a second group based at least in part on a second subject matter;
providing for display on a user computing device a first visual representation corresponding to the first subset of images, the first visual representation comprising a first thumbnail image representative of the first subject matter, and a second visual representation corresponding to the second subset of images, the second visual representation comprising a second thumbnail image representative of the second subject matter;
receiving a selection of the first thumbnail image, the second thumbnail image being unselected;
automatically identifying a first keyword based at least in part on the user selection of the first thumbnail image, the first keyword not included in the user search query, wherein the identification of the first keyword is based at least in part on identifying words used in webpages associated with the first subset of images represented by the selected first thumbnail image, wherein the identified words appear in greater frequency in webpages associated with the first subset of images represented by the selected first thumbnail image than a frequency of appearance of the identified words in webpages associated with the second subset of images represented by the unselected second thumbnail image;
executing a first refined image search using a first search query comprising the automatically identified first keyword, wherein the first search query comprising the automatically identified first keyword is different than the user search query, wherein the first refined image search is performed using a first textual search query comprising the automatically identified first keyword;

receiving second ranked image search results from the first refined image search, the second ranked search results comprising a second plurality of images;
generating a similarity metric for images included in the second ranked image search results;
classifying a subset of the second plurality of images as a third group using the similarity metric for images included in the second plurality of images;
providing for display on the user computing device:
   a visual representation corresponding to the third group of images, the visual representation corresponding to the third group of images comprising a third thumbnail image, and
   a visual representation corresponding to a fourth group of images, the visual representation corresponding to the fourth group of images comprising a fourth thumbnail image;
receiving a selection of the third thumbnail image;
automatically identifying a second keyword based at least in part on the user selection of the third thumbnail image, the second keyword not included in the user search query;
executing a second refined image search using a second search query comprising the automatically identified second keyword, wherein the second search query comprising the automatically identified second keyword is different than the user search query, and wherein the second refined image search is performed using a second textual search query comprising the automatically identified second keyword; and
providing for display on the user computing device search results, comprising a fifth group of images, from the second refined image search.

10. The system of claim 9, further comprising:
a feature extractor configured to extract one or more visual features from one or more images; and
a classifier adapted to:
   identify visual features common to two or more images using the extracted visual features;
   generate a similarity metric between combinations of images based at least in part on the identified common visual features.

11. The system of claim 9, the operations further comprising providing for display, in association with the third thumbnail image, corresponding website source information and dimension information.

12. The system of claim 9, wherein a first image in the second plurality of images is included in both the third group and the fourth group at least partly in response to determining that the first image exceeds a similarity threshold with respect to other images in the third group and other images in the fourth group.

13. A computer implemented method comprising:
receiving, at a computer system comprising hardware, a user search query consisting only of text;
receiving, at the computer system, ranked image search results from a first image search corresponding to the user search query, the ranked search results comprising a first plurality of images;
classifying, by the computer system, a first subset of the first plurality of images as a first group based at least in part on a first subject matter;
classifying, by the computer system, a second subset of the first plurality of images as a second group based at least in part on a second subject matter;
providing, by the computer system, for display on a user computing device a first visual representation corresponding to the first subset of images, the first visual representation comprising a first thumbnail image representative of the first subject matter, and a second visual representation corresponding to the second subset of images, the second visual representation comprising a second thumbnail image representative of the second subject matter;
receiving, by the computer system, a selection of the first thumbnail image, the second thumbnail image being unselected;
automatically identifying, by the computer system, a first keyword based at least in part on the user selection of the first thumbnail image, the first keyword not included in the user search query, wherein the identification of the first keyword is based at least in part on identifying words used in webpages associated with the first subset of images represented by the selected first thumbnail image, wherein the identified words appear in greater frequency in webpages associated with the first subset of images represented by the selected first thumbnail image than a frequency of appearance of the identified words in webpages associated with the second subset of images represented by the unselected second thumbnail image;
executing a first refined image search using a first search query comprising the automatically identified first keyword, wherein the first search query comprising the automatically identified first keyword is different than the user search query, wherein the first refined image search is performed using a first textual search query comprising the automatically identified first keyword;
receiving, by the computer system, second ranked image search results from the first refined image search, the second ranked search results comprising a second plurality of images;
generating, by the computer system, a similarity metric for images included in the second ranked image search results;
classifying, by the computer system, a subset of the second plurality of images as a third group using the similarity metric for images included in the second plurality of images;
providing, by the computer system, for display on a user computing device:
   a visual representation corresponding to the third group of images, the visual representation corresponding to the third group of images comprising a third thumbnail image, and
   a visual representation corresponding to a fourth group of images, the visual representation corresponding to the fourth group of images comprising a fourth thumbnail image;
receiving, by the computer system, a selection of the third thumbnail image;
automatically identifying, by the computer system a second keyword based at least in part on the user selection of the third thumbnail image, the second keyword not included in the user search query;
executing a second refined image search using a search query comprising the automatically identified second keyword, wherein the search query comprising the automatically identified second keyword is different than the user search query, wherein the second refined image search is performed using a second textual search query comprising the automatically identified second keyword; and providing, by the computer system, for display on the user computing device search results, comprising a fifth group of images, from the second refined image search.

14. The method of claim 13, the method further comprising;
extracting one or more visual features from images in the second plurality of images;
identifying visual features common to two or more images in the second plurality of images;
wherein generating the similarity metric for images included in the second ranked image search results further comprises generating the similarity metric between combinations of images in the second plurality of images based at least in part on the identified common visual features.

15. The method of claim 14, wherein the visual features comprise scale-invariant features.

16. The method of claim 13, wherein the first ranked image search results comprise hyperlinks to resources.

17. The method of claim 13, wherein the method is performed using a graphic server operably coupled to a search engine, and the graphics server is coupled to the user computing device over a network.

18. The method of claim 13, the method further comprising providing for display on the user computing device, in association with the third thumbnail image, corresponding website source information and dimension information.

19. The method of claim 13, wherein a first image in the second plurality of images is included in both the third group and the fourth group at least partly in response to determining that the first image exceeds a similarity threshold with respect to other images in the third group and other images in the fourth group.

* * * * *

UNITED STATES PATENT AND TRADEMARK OFFICE
CERTIFICATE OF CORRECTION

| | | |
|---|---|---|
| PATENT NO. | : 9,092,458 B1 | Page 1 of 1 |
| APPLICATION NO. | : 13/615381 | |
| DATED | : July 28, 2015 | |
| INVENTOR(S) | : Pietro Perona et al. | |

It is certified that error appears in the above-identified patent and that said Letters Patent is hereby corrected as shown below:

In the drawings:

Sheet 4 of 5 (Reference Numeral 402, FIG. 4) at line 2, Change "IMAG" to --IMAGE--.

In the specification:

In column 3 at line 57, Change "ore" to --or--.

In the claims:

In column 14 at line 56, In Claim 13, change "system" to --system,--.

Signed and Sealed this
Sixteenth Day of February, 2016

Michelle K. Lee
*Director of the United States Patent and Trademark Office*